United States Patent [19]

Sugiyama

[11] Patent Number: 4,659,246

[45] Date of Patent: Apr. 21, 1987

[54] STRUCTURE FOR SCREWING OBJECT ON SHEET METAL

[75] Inventor: Ichirou Sugiyama, Shiki, Japan

[73] Assignee: Crown Screw Corporation, Saitama, Japan

[21] Appl. No.: 816,878

[22] Filed: Jan. 7, 1986

[30] Foreign Application Priority Data

Jul. 24, 1985 [JP] Japan .................................. 60-164764

[51] Int. Cl.[4] .......................... F16B 25/00; F16B 37/00
[52] U.S. Cl. .................................. 403/408.1; 403/388; 411/352; 411/427; 411/521
[58] Field of Search ........ 411/427, 174, 527, 522–524, 411/352, 521; 52/521, 584; 403/408.1, 388

[56] References Cited

U.S. PATENT DOCUMENTS

| | | | |
|---|---|---|---|
| 1,749,903 | 3/1930 | Cannon | 411/918 X |
| 2,172,247 | 9/1939 | Kost | 411/427 X |
| 2,470,927 | 5/1949 | Hale, Jr. | 411/999 X |
| 3,018,685 | 1/1962 | Squire | 411/520 |
| 3,315,556 | 4/1967 | Speck | 411/520 X |
| 4,310,272 | 1/1982 | Rich et al. | 403/408.1 X |

FOREIGN PATENT DOCUMENTS 889678 10/1943 France .................................. 411/427

Primary Examiner—Alfred C. Perham
Attorney, Agent, or Firm—Wenderoth, Lind & Ponack

[57] ABSTRACT

Structure for screwing on sheet metal an object having a fitting hole comprises sheet metal having a prepared hole formed therein in the shape of a saucer and also having a saucer-shaped lip which has a thickness equal to the thickness of the sheet metal and defines the prepared hole, and a screw composed of a screwhead, a shank depending from the screwhead, external threads formed around the shank and a substantially conical tip. The screw is passed through the fitting hole in the object and driven into the prepared hole in the sheet metal while catching the leading end of the saucer-shaped lip between the adjacent external threads. When the leading end of the saucer-shaped lip is clamped between the uppermost effective external thread and the adjacent effective external thread, the object is firmly clamped tightly between the screwhead and the sheet metal by synergistic effect of a force of the screw pulling up the saucer-shaped lip and a force of the saucer-shaped lip restoring to its original position against the pulling-up force of the screw due to its resilience.

5 Claims, 7 Drawing Figures

STRUCTURE FOR SCREWING OBJECT ON SHEET METAL

FIELD OF THE INVENTION AND RELATED ART STATEMENT

The present invention relates to a structure for fixing an object to sheet metal of household electric appliances etc. by means of a screw without using a nut and without using a process.

There have heretofore been adopted various means for attaching an object to sheet metal. For example, Japanese Utility Model Publication No. 53-43966 discloses, as shown in FIG. 6, a structure for screwing an object on sheet metal 1 having a prepared hole 2, in which a tapping screw is driven. While forming a flange 3 by subjecting the edge of the prepared hole 2 to burring treatment with the tapping screw, the inner wall of the flange 3, a helical internal thread 4, is formed by engagement with the helical external thread of the tapping screw. Thus, clamping of an object relative to the sheet metal 1 can be attained by the helical engagement between the external and internal threads without use of a nut.

Recently, thin sheet metal (about 0.5 mm in thickness) of high hardness and high toughness has found utility in various applications, such as in automobiles and household electric appliances, to achieve light weight structure. When the aforementioned prior art structure is adopted relative to such thin sheet metal, there is a possibility of the sharp external thread of the tapping screw biting the formed flange to an excess depth to produce cracks 5 and, worse, there is a possibility of the flange being cut off annularly. This results in considerable reduction or loss of the clamping force. Further, when cracks 5 are formed in the base portion or free end of the flange 3, the flange 3 is expanded outwardly which loosens the engagement between the external thread of the tapping screw and the internal thread 4 of the flange 3.

OBJECTS AND SUMMARY OF THE INVENTION

The present invention eliminates the aforementioned drawbacks suffered by the prior art structure which relies on burring and tapping by a tapping screw.

The main object of the present invention is to provide a structure for attaching an object to sheet metal, which is capable of firmly and reliably fixing the object to the sheet metal without either using a nut or depending on burring and tapping by a tapping screw.

To achieve the object described above, according to the present invention, there is provided a structure for screwing attaching an object having a fitting hole to sheet metal using a screw, which comprises sheet metal having a prepared hole in the shape of a saucer and a saucer-shaped lip having a thickness equal to the thickness of the sheet metal and defining the prepared hole, and a screw composed of a screwhead, a shank depending from the screwhead, external threads integrally formed around the shank and a substantially conical tip integral with the shank, and being passed through the fitting hole in the object and driven into the prepared hole in the sheet metal while catching the leading end of the saucer-shaped lip between the adjacent external threads of the screw, whereby the object is firmly and tightly clamped between the screwhead and the sheet metal by a synergistic effect of a force of the screw pulling the saucer-shaped lip up and a force of the saucer-shaped lip returning to its original position due to its resilience when the saucer-shaped lip is clamped between the uppermost effective external thread and the adjacent effective external thread.

The above and other objects, characteristic features and advantages of the present invention will become more apparent to those skilled in the art as the disclosure is made in the following description of a preferred embodiment of the invention, as illustrated in the accompanying drawings.

DETAILED DESCRIPTION OF THE PREFERRED EMBODIMENT

The present invention will now be described in detail with reference to the embodiment shown in FIGS. 1 to 3.

Figure 1:
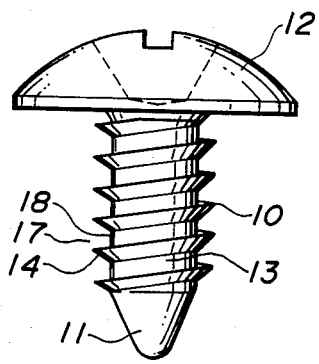
FIG. 1 is a front view illustrating a typical example of a screw usable in a structure for attaching an object on sheet metal according to the present invention.

In FIG. 1, a screw 10 usable in one embodiment of a structure for attaching an object on sheet metal according to the present invention is composed of a screwhead 12, a shank 13 depending from the screwhead 12, external threads 14 integrally formed around the shank 13, and a substantially conical tip 11 integral with the shank 13. Between the adjacent external threads 14 are formed wide grooves 17 having their buttoms constituting roots 18 which are parallel to the axis of the shank 13.

Figure 2:
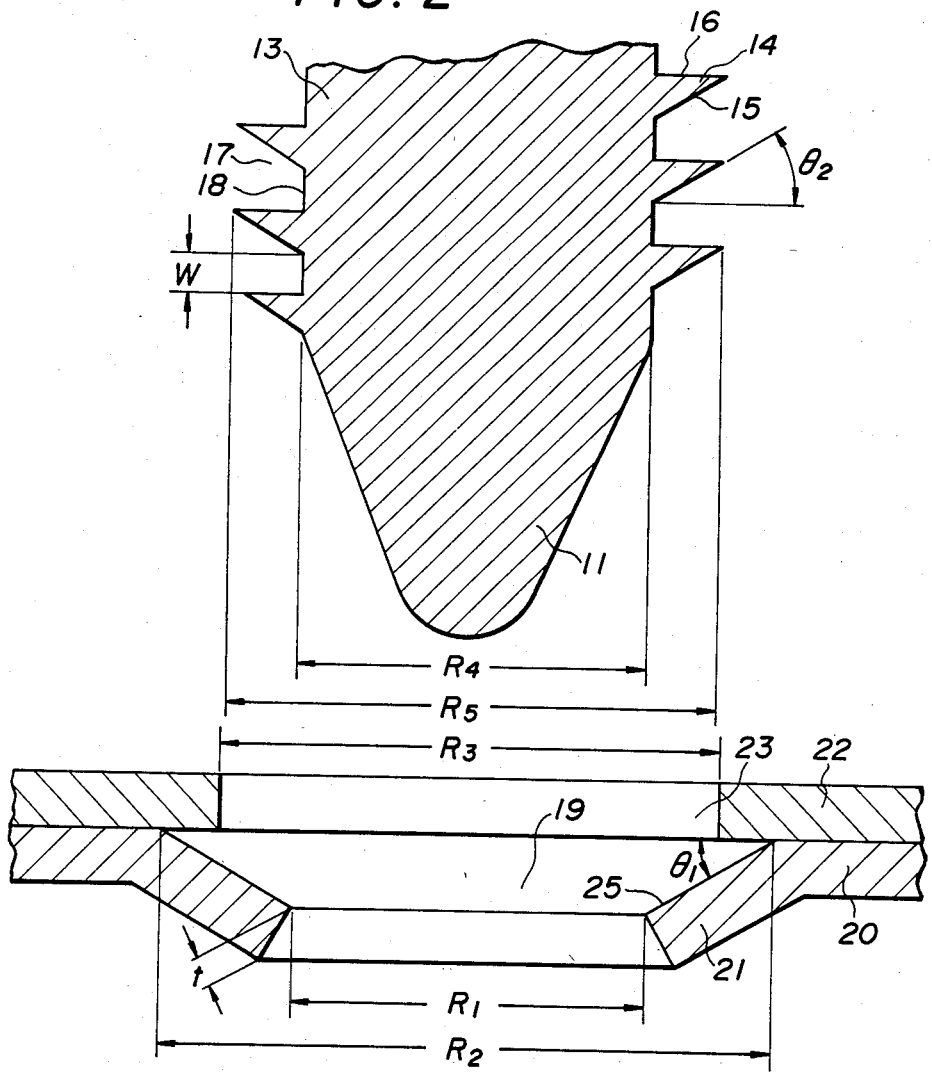
FIG. 2 is an enlarged explanatory cross section illustrating one embodiment of the structure according to the present invention in a state assumed before clamping of the object.
Figure 3:
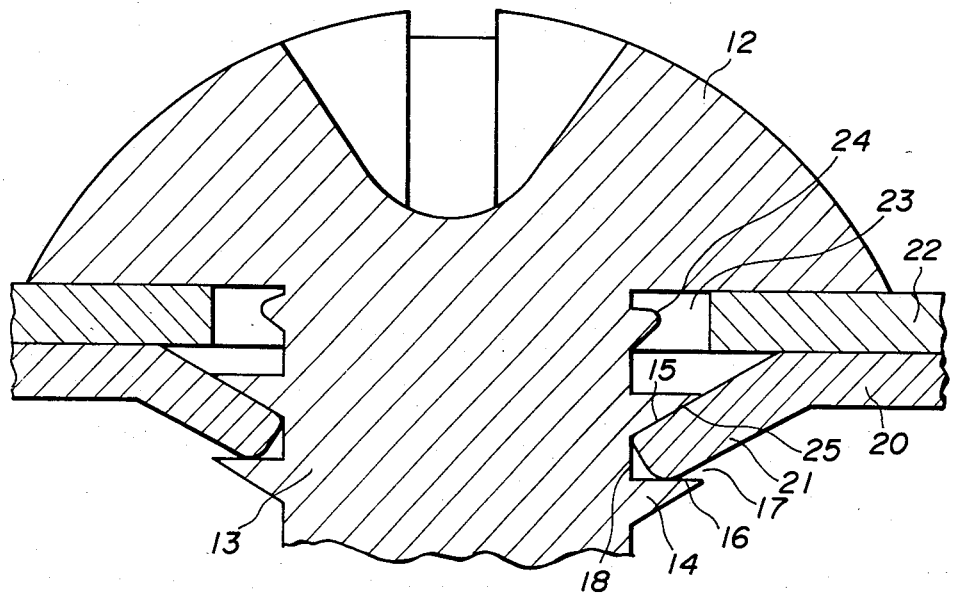
FIG. 3 is an enlarged explanatory cross section illustrating the embodiment in a state assumed after the clamping.
Figure 6:
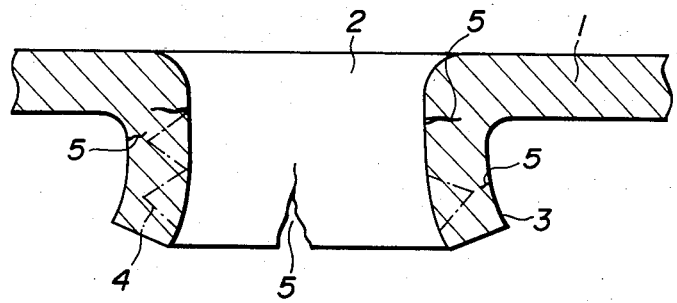
FIG. 6 is an enlarged explanatory cross section illustrating sheet metal having a flange formed in consequence of burring and tapping by the use of a tapping screw in the prior art structure.

As shown in FIG. 2, the screw 10 has leading flanks 15 inclined relative to and following flanks 16 formed substantially flatly. On the other hand, sheet metal 20 usable in this embodiment has a prepared hole 19 formed therein and has been subjected in advance to burring treatment or the like to form the prepared hole 19 in the shape of a saucer and a saucer-shaped lip 21 defining the prepared hole 19. The saucer-shaped lip 21 has a thickness t identical with the thickness of the sheet metal 20 and is slanted downwardly. The thickness t of the saucer-shaped lip 21 is slightly larger than the axial width W of the roots 18 of the screw 10 and is smaller than the open width of the wide grooves 17 so that the leading end of the saucer-shaped lip 21 may be admitted by the wide grooves 17 of the screw 10. The upper surface 25 of the saucer-shaped lip 21 defined between the largest-diameter edge and the smallest-diameter edge of the prepared hole 19 forms an angle $\theta_1$ relative to the upper surface of the sheet metal 20. This angle $\theta_1$ is substantially the same as the flank angle $\theta_2$ of the leading flanks 15. An object 22 to be fixed by the structure of the present invention comprising the screw 10 and the sheet metal 20 has a preformed fitting hole 23. The smallest and largest diameters $R_1$ and $R_2$ of the prepared hole 19 in the sheet metal 10, the diameter $R_3$ of the fitting hole 23 in the object 22, and the minor and major diameters $R_4$ and $R_5$ of the external threads 14 of the screw 10 have a relation of $R_2 > R_3 > R_5 > R_4 > R_1$. By setting the angle $\theta_1$ substantially equal to the angle $\theta_2$ and the diameter $R_5$ smaller than the diameter $R_2$, as described above, the leading flanks 15 can be held in contact and engagement with the upper surface 25 of the saucer-shaped lip 21.

Since the diameter $R_3$ of the fitting hole 23 in the object 22 is slightly larger than the major diameter $R_5$ of the external thread 14, the screw 10 can be passed loosely through the fitting hole 23 and driven into the prepared hole 19 from the base end of the lowermost external thread 14 flush with the surface of the shank 13. As the screw driving proceeds, the leading end of the saucer-shaped lip 21 is guided into the wide grooves 17 and pulled up gradually. Consequently, as illustrated in FIG. 3, the leading end of the saucer-shaped lip 21 is caught fast between the uppermost effective external thread 14 and the adjacent effective external thread 14, with the upper surface 25 of the saucer-shaped lip 21 brought into intimate contact with the leading flank 15 of the uppermost effective external thread 14 due to the relation between the angles $\theta_1$ and $\theta_2$. The upper and lower edges of the leading end of the saucer-shaped lip 21 are forcibly pressed respectively against the base end of the uppermost effective external thread 14 and against the following flank 16 of the adjacent effective external thread 14. At this time, the screw 10 pulls the saucer-shaped lip 21 in the direction reverse to the screw driving direction, whereas the saucer-shaped lip 21 is urged in the direction restoring to its original position due to its resiliency. Since the saucer-shaped lip 21 is slanted downwardly, it can only be pinched between the adjacent effective external threads 14, with the incomplete external threads 24 being disposed between the screwhead 14 and the saucer-shaped lip 21 and having nothing to do with the clamping of the object 22. Further, since the diameter $R_3$ of the fitting hole 23 in the object 22 is smaller than the largest diameter $R_2$ of the prepared hole 19 in the sheet metal 20, the base end of the saucer-shaped lip 21 is disposed on the lower edge of the fitting hole 23. Therefore, the object 22 can firmly be clamped between the screwhead 12 and the sheet metal 20. In driving the screw 10 into the prepared hole 19 in the sheet metal 20, since the external threads 14 constitute a continuously helical thread, a single oblique notch (not shown) is formed in the leading end face of the saucer-shaped lip 21. The helical external thread advances along the single oblique notch until the state shown in FIG. 3 is established.

Figure 4:
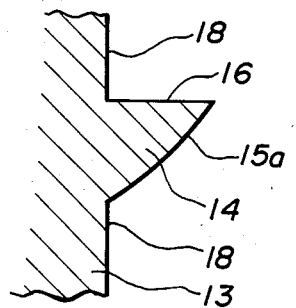
FIG. 4 is a partially cutaway enlarged cross section illustrating another example of the screw usable for the purpose of the present invention.

The leading flanks 15 may optionally be formed into gently convex surfaces 15a as illustrated in FIG. 4. In this case, the gently convex flanks 15a can smoothly clear the saucer-shaped lip 21 when the screw 10 is driven into the prepared hole 19 in the sheet metal 20.

Further, a plurality of ribs (not shown) may be provided along either of the upper surface 25 or the lower surface of the saucer-shaped lip 21 so as to secure high rigidity of the sheet metal 10 and highten the clamping force exerted on the object 22.

According to the present invention, as described above, the object screwing structure comprises sheet metal having a prepared hole in the shape of a saucer and a saucer-shaped lip having a downward inclination and defining the prepared hole, and a screw and so the object can be clamped reliably and firmly between the screwhead and the sheet metal by catching the saucer-shaped lip fast between the adjacent effective external threads of the screw and by utilizing the synergistic effect of the pulling-up force of the screw and the restoring force of the saucer-shaped lip. Therefore, the drawbacks and disadvantages suffered by the conventional object screwing structure can be overcome. Furthermore, the present invention can accommodate a change in its use with a relatively thick soft steel material to a thin steel material of high toughness and high hardness in the industries of household electric appliances, automobiles, etc.

Figure 5A:
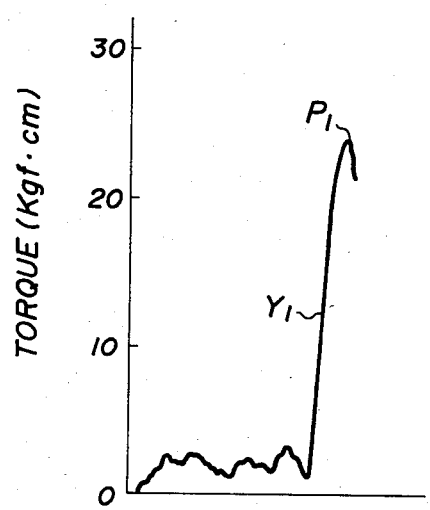
FIG. 5(A) is a graph showing a characteristic curve of the clamping torque in the embodiment.
Figure 5B:
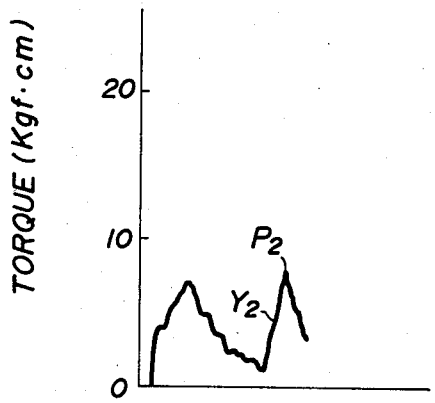
FIG. 5(B) is a graph showing a characteristic curve of the clamping torque in a prior art structure for screwing an object on sheet metal.

In order to demonstrate superiority of the structure of the present invention to that of the prior art structure, experiments have been conducted. The results are as shown in FIGS. 5(A) and 5(B). FIG. 5(A) shows a characteristic curve $Y_1$ representing the clamping torque obtained under the conditions that SPCC (a cold-rolled steel plate standardized as JIS G3141) having a thickness of 0.45 mm was used as the sheet metal 20 of the present structure, the angle $\theta_1$ of the inclined saucer-shaped lip 21 was set at 60°, the smallest diameter $R_1$ of the prepared hole 19 in the sheet metal 20 was 2.6 mm and the major diameter $R_5$ of the external thread 14 was 4.06 mm. FIG. 5(B) shows a characteristic curve $Y_2$ representing the clamping torque obtained by the prior art structure in which SPCC of the same thickness was used as the sheet metal 1, the diameter of the prepared hole 2 was 3.40 mm, the height of the flange 3 was 2.8 mm, and the major diameter of the external thread of the tapping screw was 4.06 mm which is the same as that of the screw used in the present invention. As is clear from the comparison between FIGS. 5(A) and 5(B), the structure of the present invention exhibits the peak $P_1$ of about 24 Kgf·cm, whereas that of the prior art exhibits the peak $P_2$ of about 8 Kgf·cm even when the desired clamping can be attained between the external thread of the tapping screw and the internal thread 4 formed in the flange 3 in consequence of the tapping by the tapping screw. Therefore, when an object is clamped to thin sheet metal having a thickness of about 0.5 mm, the present structure is much superior to the prior art structure.

What is claimed is:

1. A structure comprising a screw and an object having a fixing hole and a piece of sheet metal to which the object is fixed by said screw extending through said fixing hole comprising:

said screw having a screw head at one end having a diameter larger than that of the fixing hole for engaging one side of the object, and a shank having a substantially uniform diameter, said shank integral with and extending from said screw head and having an external thread on the outer surface thereof, said thread having a following flank facing said screw head forming one side of said thread and extending substantially perpendicular to the outer surface of said shank and a leading flank forming the other side of said thread meeting said following flank at a predetermined angle, said thread extending spirally around the outer surface of said shank so that the spacing between the turns of said thread along the outer surface of said shank has a predetermined width as measured in the direction in which the shank extends; and the piece of sheet metal having a surface for engaging the other side of said object, a receiving hole therethrough, and an annular lip of uniform thickness having in inner circular edge defining said circular receiving hole and an outer circular edge at which said annular lip is bent from the surface of said sheet metal away from the object and at a predetermined angle relative to the surface of said piece of sheet metal so as to form a frustrum shaped depression at the surface of said sheet metal open to and communicating with said receiving hole, said shank of said screw extending through said frustrum shaped depression and said receiving hole so that said annular lip is engaged between said following and leading flanks of said thread to mate therewith for attaching the object between said screw head and said surface of said piece of sheet metal.

2. A structure as claimed in claim 1 wherein,
said angle at which said leading flank meets said following flanks is equal to said predetermined angle at which said annular lip is bent from the surface of said sheet metal.

3. A structure as claimed in claim 1 wherein,
said leading flank is slightly convex.

4. A structure as claimed in claim 1 wherein,
said uniform thickness of said annular lip is larger than said predetermined width of said spacing between the turns of said thread.

5. A structure as claimed in claim 1 wherein,
the diameter of said outer circular edge of said annular lip is greater than the diameter of the fixing hole so that said outer edge is supported by the object when the object is attached to said piece of said sheet metal.

* * * * *